United States Patent [19]
Herrick

[11] Patent Number: 5,273,208
[45] Date of Patent: Dec. 28, 1993

[54] CONSTANT TEMPERATURE VALVE

[76] Inventor: Frank A. Herrick, 18 Fenn Dr. P.O. Box 76, Pleasant Valley, Conn. 06063

[21] Appl. No.: 989,161

[22] Filed: Dec. 11, 1992

[51] Int. Cl.$^5$ .......................................... G05D 23/13
[52] U.S. Cl. .............................. 236/12.18; 236/101 D; 137/625.31
[58] Field of Search ................ 137/625.31, 625.41; 251/208, 304; 236/101 D, 101 A, 12.18, 12.11

[56] References Cited
U.S. PATENT DOCUMENTS

| | | | |
|---|---|---|---|
| 1,842,358 | 1/1932 | Cartier | 236/12.11 |
| 1,943,705 | 1/1934 | Trubert | 136/12.11 |
| 1,989,335 | 1/1935 | Parsons | 236/12.18 |
| 2,138,852 | 12/1938 | Gitzendanner | 236/12.18 |
| 2,272,403 | 2/1942 | Fields | 236/12.11 |
| 2,476,702 | 7/1949 | Coldbath | 236/12.11 |
| 2,565,290 | 8/1951 | Zak | 236/101 X |
| 3,352,489 | 11/1967 | Coulombe et al. | 236/12.1 |
| 3,730,430 | 5/1973 | Osheroff | 236/101 X |
| 3,954,222 | 5/1976 | Bjorklund et al. | 236/12 |
| 3,980,229 | 9/1976 | Stedmann et al. | 236/12 |
| 4,285,465 | 8/1981 | North | 236/12 |
| 4,554,948 | 12/1985 | Bergmann | 137/625.31 |
| 4,653,687 | 3/1987 | Weber | 236/12.11 |
| 4,785,624 | 11/1988 | Smith et al. | 137/625.31 |

*Primary Examiner*—William E. Wayner
*Attorney, Agent, or Firm*—Chilton, Alix & Van Kirk

[57] ABSTRACT

The valve includes a cylindrical wall, adjacent and distinct hot and cold fluid inlet ports passing through a first wall portion, each port having a plurality of slotted inlet orifices at the inner surface of the wall. A rigid, coiled metal ribbon member is fixedly supported at one end by the base, and has a free end adjacent the body wall. A gate member is affixed to the free end of the ribbon member and is supported against the first wall portion for circumferential movement along the first wall portion in response to expansion and contraction of the ribbon member The gate member includes a plurality of slotted orifices arranged as a hot set alignable with the hot inlet orifices and a cold set alignable with the cold inlet orifices. Once set for a desired temperature, the gate orifices passively move with the expansion or contraction of the ribbon member to maintain the temperature corresponding to the initial setting. The gate orifices move either clockwise or counter clockwise in the same direction as the temperature of the mixture deviates from the set point. However, the effect of the gate orifice movement is opposite with respect to the hot and cold inlet water. When the ribbon member expands (contracts), the hot set of orifices decreases (increases) hot inlet flow, while the cold set of orifices increases (decreases) cold inlet flow. Thus, the desired adjustment toward the set point is accomplished by the dual action of both sets of orifices.

9 Claims, 7 Drawing Sheets

CONSTANT TEMPERATURE VALVE

The present invention relates generally to household plumbing, and more particularly, to a constant temperature valve for use with showers, sinks, and other appliances through which a mixture of hot and cold water is discharged.

As is well known from common experience, one who is halfway through a soothing shower is not prepared to accommodate a sudden change in the pressure or temperature of the water in a hot or cold source line to the shower. Such sudden change can result from another's opening a faucet, or the start-up of a washing machine, elsewhere on the premises. In a more severe and dangerous situation, the cold source line can break, leaving only hot, scalding water delivered to the shower head. This rapid temperature change would be difficult enough to compensate if the user had his or her hand on the shower controls; but with neither hand on the controls, a face full of soap, and one's mind on the gentle massage of the comforting shower spray, prompt and effective countermeasures are virtually impossible to achieve manually.

Known mixing valves for addressing this problem, e.g., for use in bathrooms, are represented by U.S. Pat. Nos. 4,285,465 and 3,352,489. Generally, some type of temperature sensitive component is subjected to the mixture of hot and cold water in the valve, whereby the expansion or contraction of the component passively adjusts the proportion of hot and cold water that is mixed. U.S. Pat. Nos. 2,272,403; 2,565,290; and 3,352,489 disclose the use of a bimetallic coil as the temperature sensitive component, a knob or lever for setting the desired temperature initially, and a sliding or rotating movement of a gate by the free end of the coil, to automatically adjust the mix of hot and cold water as the feed line temperature changes.

Known mixing valves of this type have at least two significant disadvantages. They are complex, and/or slow to react. These are usually related deficiencies, because a significant period of time is required for the expansion component to elongate or contract a distance sufficient to move a flow control gate through an effective range. Attempts to amplify the effect of the slow component movement by increasing the mechanical advantage through linkages and the like, necessarily bring greater cost and complexity.

SUMMARY OF THE INVENTION

It is, accordingly, an object of the present invention to provide a constant temperature flow mixing valve which, in the context of bathroom appliances and the like, is simple yet fast-acting and reliable.

This is accomplished by utilizing a movable slotted gate in combination with a stationary slotted gate, at each of the hot and cold inlet ports, to achieve rapid adjustment of the effective flow area from each inlet port to the flow mixing chamber of the valve.

In a particular embodiment, the valve includes a substantially cylindrical body having a cylindrical wall, a base closing the cylinder at one end, a cover closing the cylinder at the other end, and an axis passing centrally of the wall through the base and the cover. Adjacent and distinct hot and cold fluid inlet ports pass through a first wall portion, each port having a plurality of slotted inlet orifices at the inner surface of the wall. An outlet port in a second wall portion, is situated substantially in diametral opposition to the inlet ports. A rigid, coiled metal ribbon member is fixedly supported at one end by the base, and has a free end adjacent the body wall. The ribbon member has a variable length which is commensurate with the average temperature in the body. A gate member is affixed to the free end of the ribbon member and is supported against the first wall portion for circumferential movement along the first wall portion in response to expansion and contraction of the ribbon member The gate member includes a plurality of slotted orifices arranged as a hot set alignable with the hot inlet orifices and a cold set alignable with the cold inlet orifices. The inlet and gate orifices thereby interact to admit a variable proportion of hot and cold fluid into the body which the mixes and influences the length of the ribbon member commensurately with the average temperature of the mixed fluid, before exiting the body through the outlet port. A setpoint adjustment member is preferably mounted on the base for rotational movement about the axis, with one end of the ribbon member being secured to the adjustment member, whereby the gate orifices can initially be set with Vernier manual control by turning the adjustment member to a desired rotational position.

Once set for a desired temperature, the gate orifices passively move with the expansion or contraction of the ribbon member to maintain the temperature corresponding to the initial setting. The gate orifices move either clockwise or counter clockwise in the same direction as the temperature of the mixture deviates from the set point. However, the effect of the gate orifice movement is opposite with respect to the hot and cold inlet water. When the ribbon member expands (contracts), the hot set of orifices decreases (increases) hot inlet flow, while the cold set of orifices increases (decreases) cold inlet flow. Thus, the desired adjustment toward the set point is accomplished by the dual action of both sets of orifices.

BRIEF DESCRIPTION OF THE DRAWINGS

These and other objects and advantages will be described below with reference to the accompanying drawings, in which.

DESCRIPTION OF THE PREFERRED EMBODIMENT

Figure 1A:
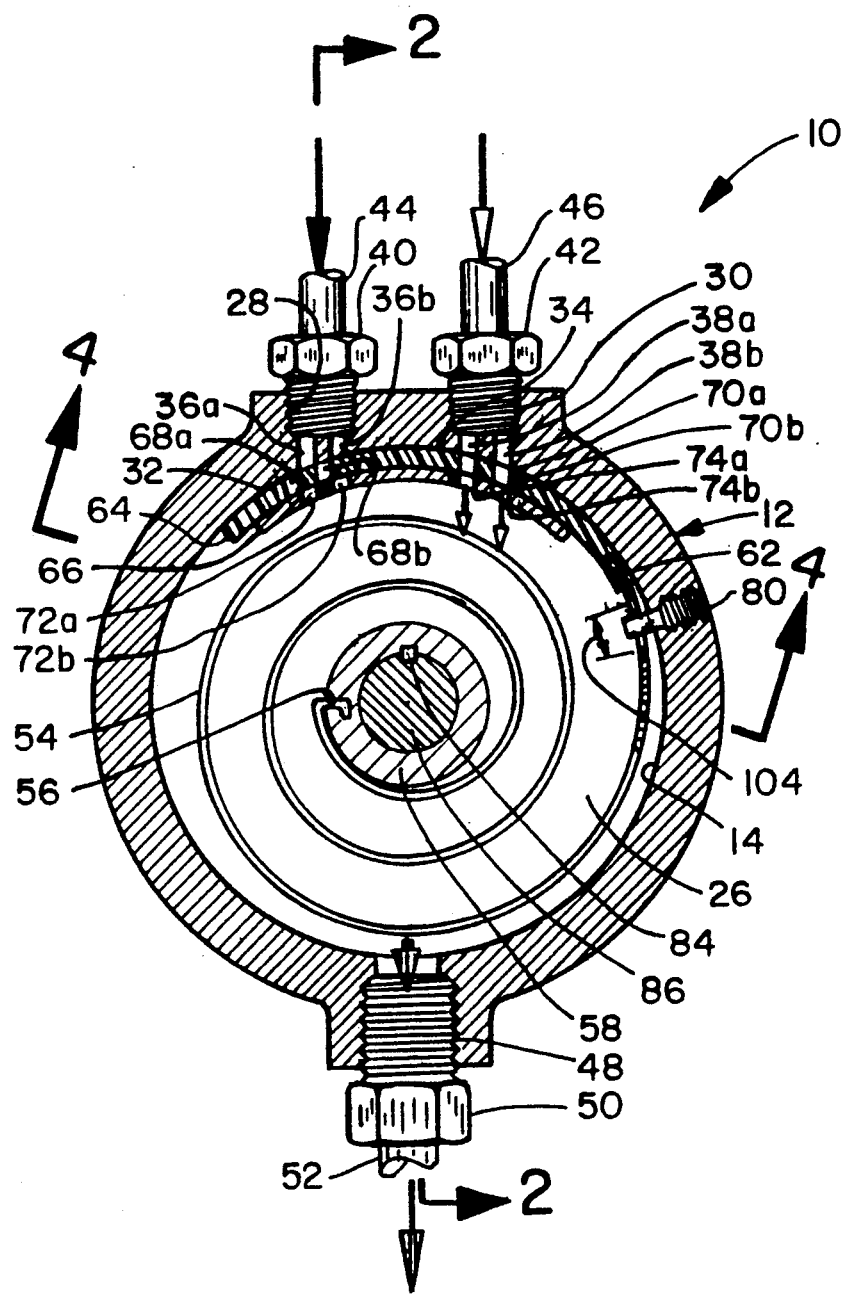
FIGS. 1A and 1B are two plan views, in different scale and section, of a constant temperature mixing valve in accordance with the invention, showing a condition of the control gates whereby the admission of hot water is blocked and cold water is admitted with full flow to the mixing chamber.
Figure 1B:
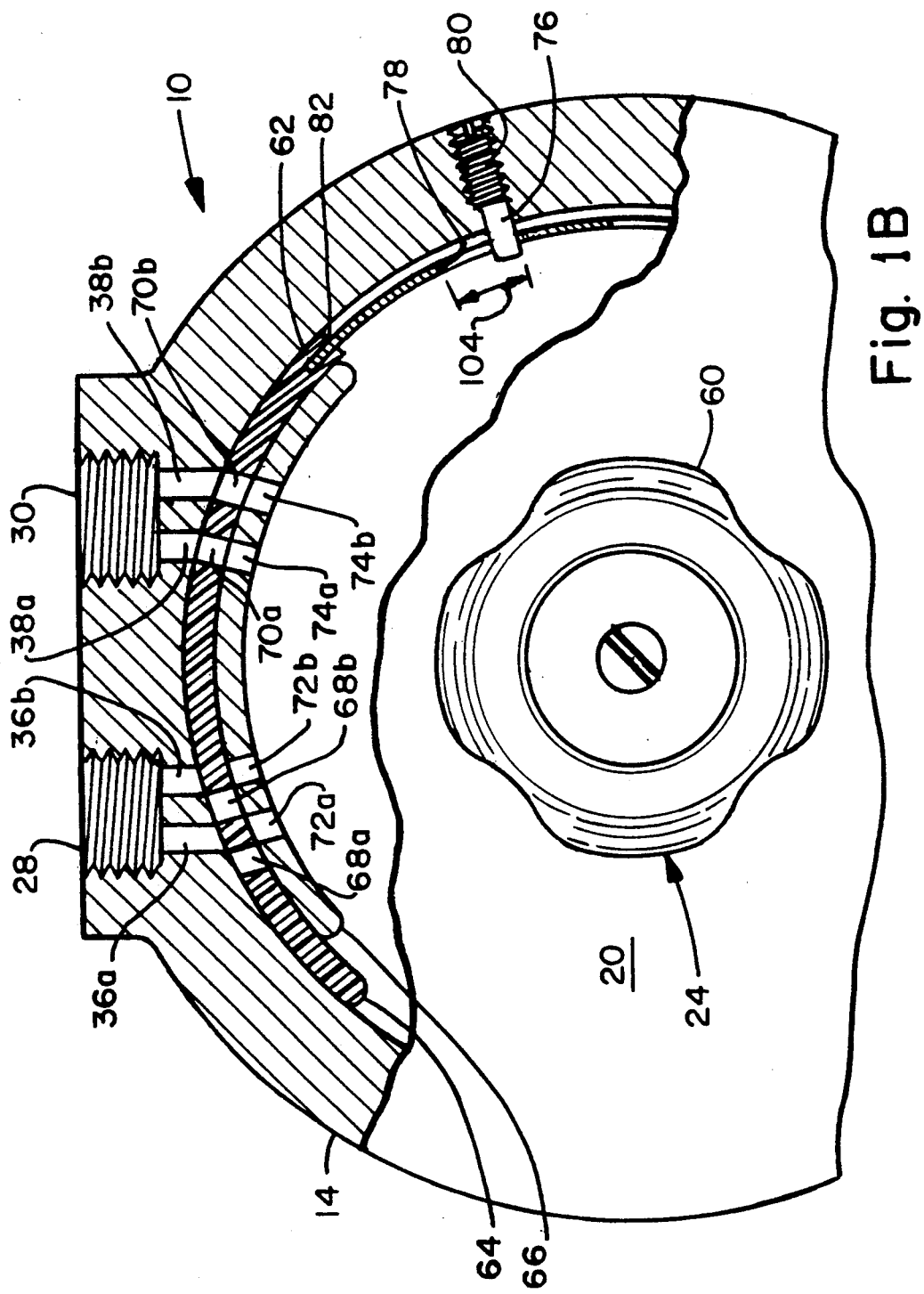
Figure 2:
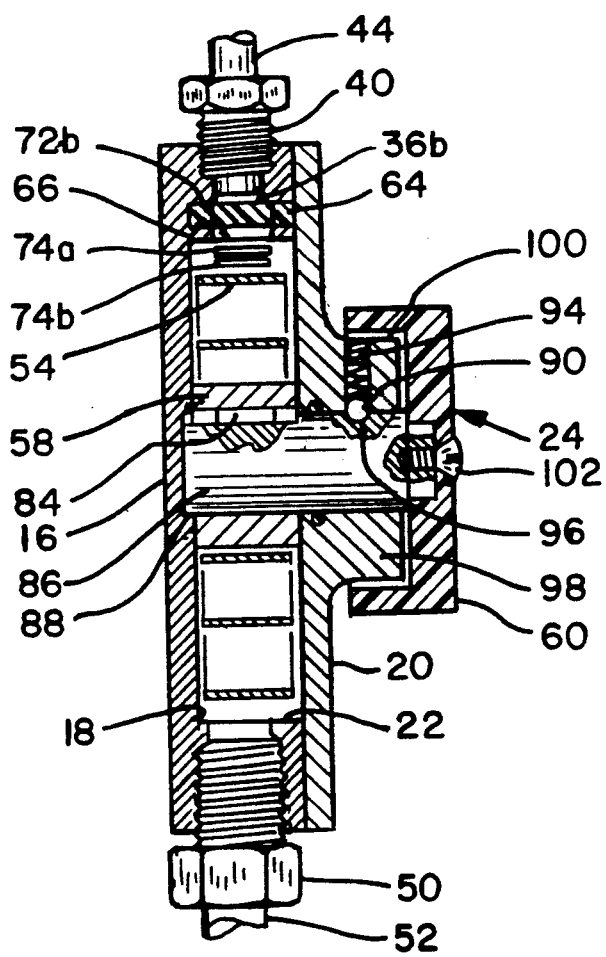
FIG. 2 is a section view taken along line 2—2 of FIG. 1.

FIGS. 1 and 2 show a constant temperature mixing valve 10 having a substantially cylindrical body 12 defining a cylindrical inner wall 14 and a base 16 which closes off one axial end 18 of the wall. A cover 20, preferably removable, sealingly closes the other end 22 of the wall 14. The cover 20 carries control knob structure 24 situated substantially about the extended axis of the body 12. The volume defined between the body and the cover forms a chamber 26.

Adjacent and distinct hot and cold fluid inlet ports 28, 30 pass through respective first and second wall portions 32, 34, for fluid communication with the chamber 26. At the interface with the inner wall surface of the chamber 26, each port 28, 30 is in the form of a plurality of slots 36 $a,b$ and 38 $a,b$, defining distinct, side-by-side orifices having predetermined spacing. Preferably, both inlet ports 28, 30 are in the same quadrant of the wall 14. The ports are adapted to receive standard fittings 40, 42 by which hot and cold source lines 44, 46 can be connected to the valve 10 when installed in a bathroom or similar facility.

An outlet port 48 is provided in the opposite quadrant of the wall 14, in fluid communication with the chamber 26. The outlet port 48 can be a standard threaded bore for connection to an outlet fitting 50 which delivers the mixed not and cold water to a shower head or the like via outlet line 52.

A rigid, coiled metal ribbon member 54 is situated in the chamber 26 and fixedly supported at one end 56 directly or indirectly to a sleeve 58. Preferably, the sleeve 58 is fixed to the control knob structure 24 for rotational movement with knob 60 about the axis of the body. The ribbon member 54 has a free end 62 adjacent the body wall 14 in the quadrant between the inlet port quadrant and the outlet port quadrant. A control gate member 64, to be described in greater detail below, is fixedly connected to and extends along the chamber wall from, the free end 62 of the ribbon member 54.

The ribbon member 54 is made of a metal that has a relatively high coefficient of thermal expansion. Therefor, the total length of the ribbon member 54 is commensurate with the average temperature within the chamber 26. In general, the ribbon member 54 should be optimized by selecting a material and dimensions, such that the total mass is minimized to minimize cost and the time lag necessary for the temperature of the mass to follow changes in the chamber temperature, while maximizing the length to obtain the greatest absolute movement of the free end as the chamber temperature changes and the rigidity to assure positive actuation of the control gate member 64.

The gate control member 64 spans the first and second portions 32, 34 of the chamber wall 14 and is preferably supported by an arcuate rail 66 which extends upward integrally from the base 16 in radially inward spaced relation from the wall portions containing the inlet ports. The control gate member 64 thus is restrained to move only circumferentially along the chamber wall portions 32, 34.

The gate member 64 includes first and second sets of slotted apertures 68$a,b$ and 70$a,b$ having a shape similar to the apertures 36, 38 of the inlet ports. The control gate slots 68, 70 and the port slots 36, 38 are preferably formed as shown in detail in FIG. 1B so as not to align in exact correspondence. In the illustrated embodiment, the port slots 36, 38 are parallel and of identical width; the gate slots 68, 70 are radial and of a width substantially equal to that of the port slots. However, it can be seen that the total span of the gate slots 68, 70 along the wall position 32, 34 is greater than the total span of the port slots 36, 38. This span can alternatively be less (see FIG. 8).

In the embodiment of FIG. 1, it is impossible to simultaneously exactly register all the gate slots 68,70 with all the port slots 36,38. This offset effect is adapted to maintain a differential effect between the hot and cold flow rates into the mixing chamber as the gate passively adjusts position in response to unanticipated changes in the source line temperatures or pressures.

The rail 66 has slots 72$a,b$ and 74$a,b$ which align substantially exactly with the port slots, 36$a,b$ and 38$a,b$ so that the relation of the gate slots 68, 70 to the rail slots 72, 74 is the same as the relation of the gate slots 68, 70 to the port slots 36, 38. The gate member 64 should pass between the rail 66 and the wall portions 32, 34 with a very close, slightly resistant fit. Preferably, the gate member is made of a plastic material, such as Teflon. To some extent, optionally sizing the outlet port 48 with an effective flow area less than the flow area of the inlet slots 36, 38, can produce a back pressure urging the gate member 64 against the first and second wall portions 32, 34.

This arrangement of the slots 36, 68 and 38, 70 provides rapid yet fine control action with only slight movement of one control member relative to another, e.g., the gate member 64 relative to the port slots 36, 38. Such control originates in two instances in accordance with the present invention. First, the user turns on the hot and cold water in lines 44 and 46 so that cold water enters chamber 26, causes the ribbon members 54 to contract, thereby admitting hot water until an equilibrium temperature and gate member position are achieved. The user then actively adjusts hot water and cold water flow by rotating the control knob 60 slightly to produce a comfortable average temperature at the outlet port 48. The user enters the shower. The inherent sensitivity of the ribbon 54 to temperature fluctuations in the chamber 26, produces a second, passive control action by automatically adjusting the relationship of the gate 64 and port slots 36, 38 to maintain the average temperature of the mixture in the chamber, substantially at the temperature initially set by the user with knob 60.

Figure 4:
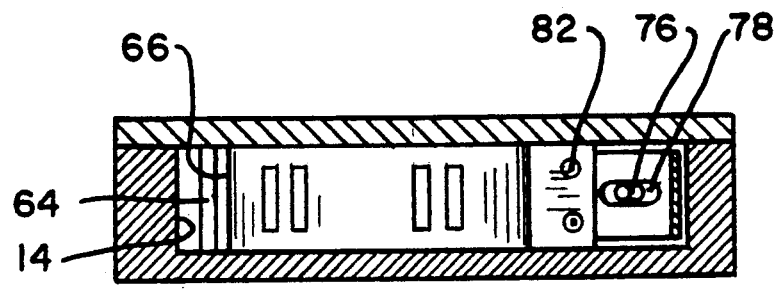
FIG. 4 is a section view along line 4—4 of FIG. 1, showing pin and slot which sets the limits of motion of the control gates.

The total displacement range of the gate member 64 is, however, limited by stop means such as shown at 76, 78 in FIGS. 1 and 4. A set screw 80 defines a pin 76 which enters the chamber 26 through the wall 14, preferably in the quadrant at which the free end 62 of the ribbon member 54 is attached at 82 to the gate member 64. Near this attachment, the ribbon member 54 has a longitudinal slot 78 in which the pin 76 is disposed. Regardless of whether control is active or passive, the gate member 64 can be displaced only between the absolute limits defined by the interaction of the pin 76 and ribbon slot 78. In the embodiment of FIG. 1, the slot 78 has a length equal 104 to the width of a flow slot such as 36a or 70a, plus the pin thickness.

Figure 3:
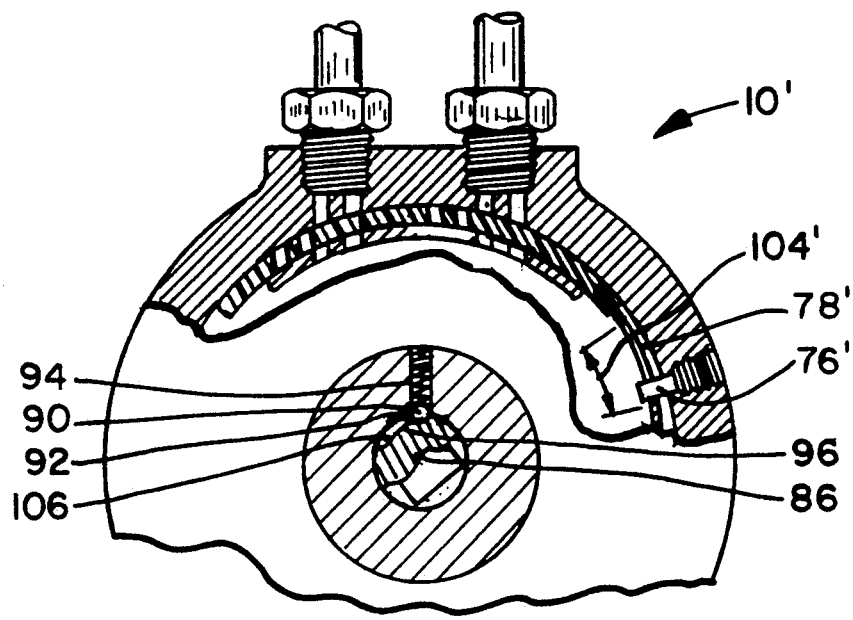
FIG. 3 is a plan view similar to FIG. 1B, showing a first alternative embodiment in a condition in which both the hot and cold water are blocked from admittance to the mixing chamber.
Figure 5:
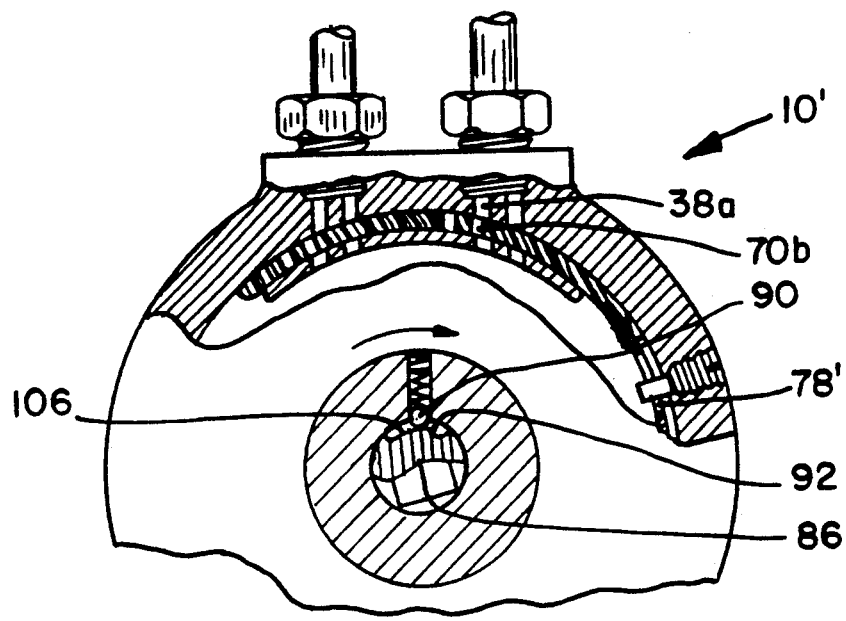
FIG. 5 is a plan view similar to FIG. 3, showing the control gates in a condition for admitting cold water before admitting hot water, as the user rotates the control knob toward the right from the closed condition of FIG. 3.
Figure 6:
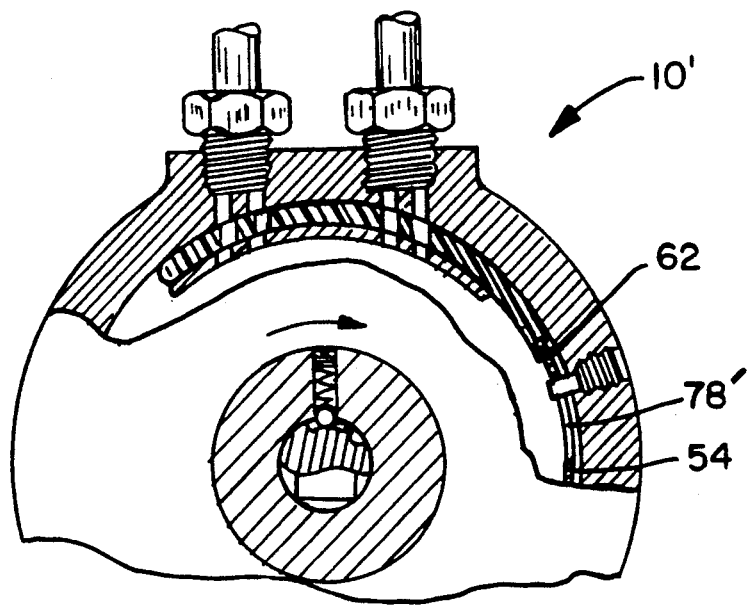
FIG. 6 is a plan view similar to FIG. 3, showing the control gates in a substantially fully open condition that is amenable to automatic temperature compensation during the taking of a shower.

FIGS. 3, 5, and 6 show an alternative embodiment in which the total span of gate orifices 68,70 is slightly less than the total span of port slots 36,38. In this embodiment, the gate member has an initial position (FIG. 3) by which no water is admitted to the chamber even with the feed lines 44,46 open. The travel 104' of the gate member permitted by slot 78', is longer than in the embodiment of FIG. 1.

The limit positions of the gate member are correlated to distinct control modes set by the user with the control knob. As shown in the valve 10' of FIG. 3, at the start mode of control, the gate slots are all offset counterclockwise and out of registry with the respective port slots. The pin 76 is at the counter clockwise limit of the ribbon slot 78'. The control knob 60 positions a spring loaded 94 cam roller ball 90 on a detent 92 in a cam race 96. In the embodiment shown the hollow sleeve 58 is keyed at 84 to a central shaft 86 which extends upwardly from a slidable support in a round notch 88 in the base 16 of the body. A post 98 on the cover 20 has a radial bore and set screw by which the spring 94 urges the cam ball 90 toward the axis of rotation. The shaft 86 is situated for rotation about the axis. The ribbon member 54 is attached to the sleeve 58 and a lever or round knob 60 is attached to the upper end of the shaft via screw 102. The outer surface of the shaft within the sleeve, defines the cam race 96.

FIGS. 5 and 6 show the active mode of control, wherein the user rotates the shaft 86 clockwise, overcoming the detent 92, so as to roll the ball 90 on the slope 106 of the race 96. The gate member is thereby continuously adjustable from a condition in which only cold water is admitted into the chamber via the alignment of only one gate slot 70b with one cold inlet slot 38a (FIG. 5), through a condition in which approximately equal flows of hot and cold water are admitted into the chamber (FIG. 6). The FIG. 3 and FIG. 6 conditions are at or near the stop limits of the ribbon slot 78'. Therefor, the user cannot turn the knob so far clockwise as to admit substantially only hot water. This feature is important to prevent the user from inadvertently scalding himself while trying to set the initial water temperature.

Once the initial temperature has been set (e.g., FIG. 6), the user proceeds to take a shower. In the event of a change in a source line temperature or pressure, the ribbon member 54 will expand or contract commensurately. Even with a relatively long ribbon member and a temperature change of about 50 degrees F. in the chamber, the free end 62 of the ribbon member moves only a fraction of an inch. Whereas such small movement could not drive mechanical linkages of the type known in the art for fluid flow compensation control, such movement is sufficient in the present invention, to significantly affect the proportion of hot and cold flow into the chamber. This sensitivity results from the relationship of the slots in the ribbon and inlet ports, whereby as more hot (cold) water is admitted, less cold (hot) water is admitted, providing a double action in the desired direction of temperature change.

Figure 7:
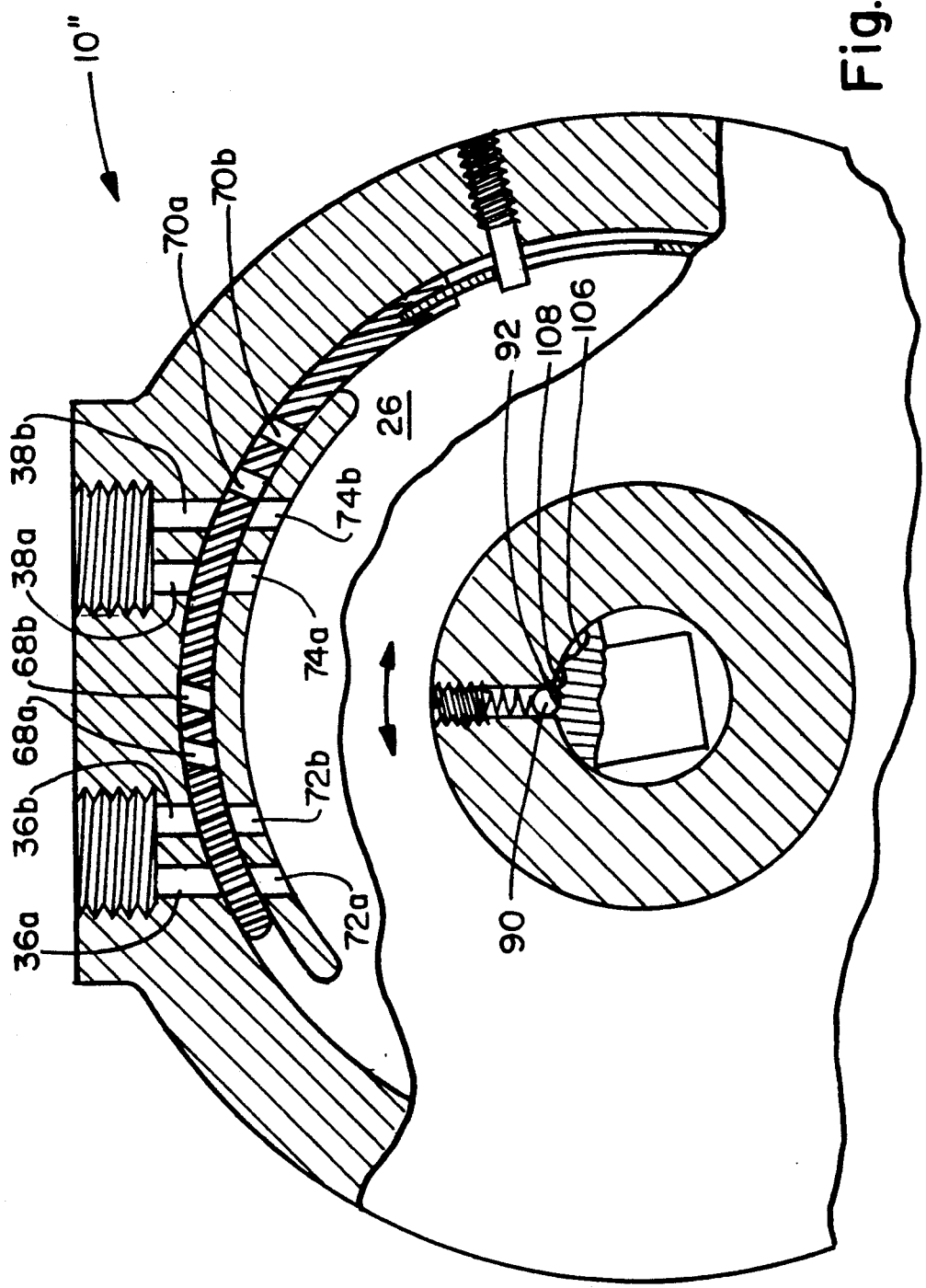
FIG. 7 is a plan view of a second alternative embodiment, showing a condition in which both hot and cold water are blocked from admittance to the mixing chamber.
Figure 8:
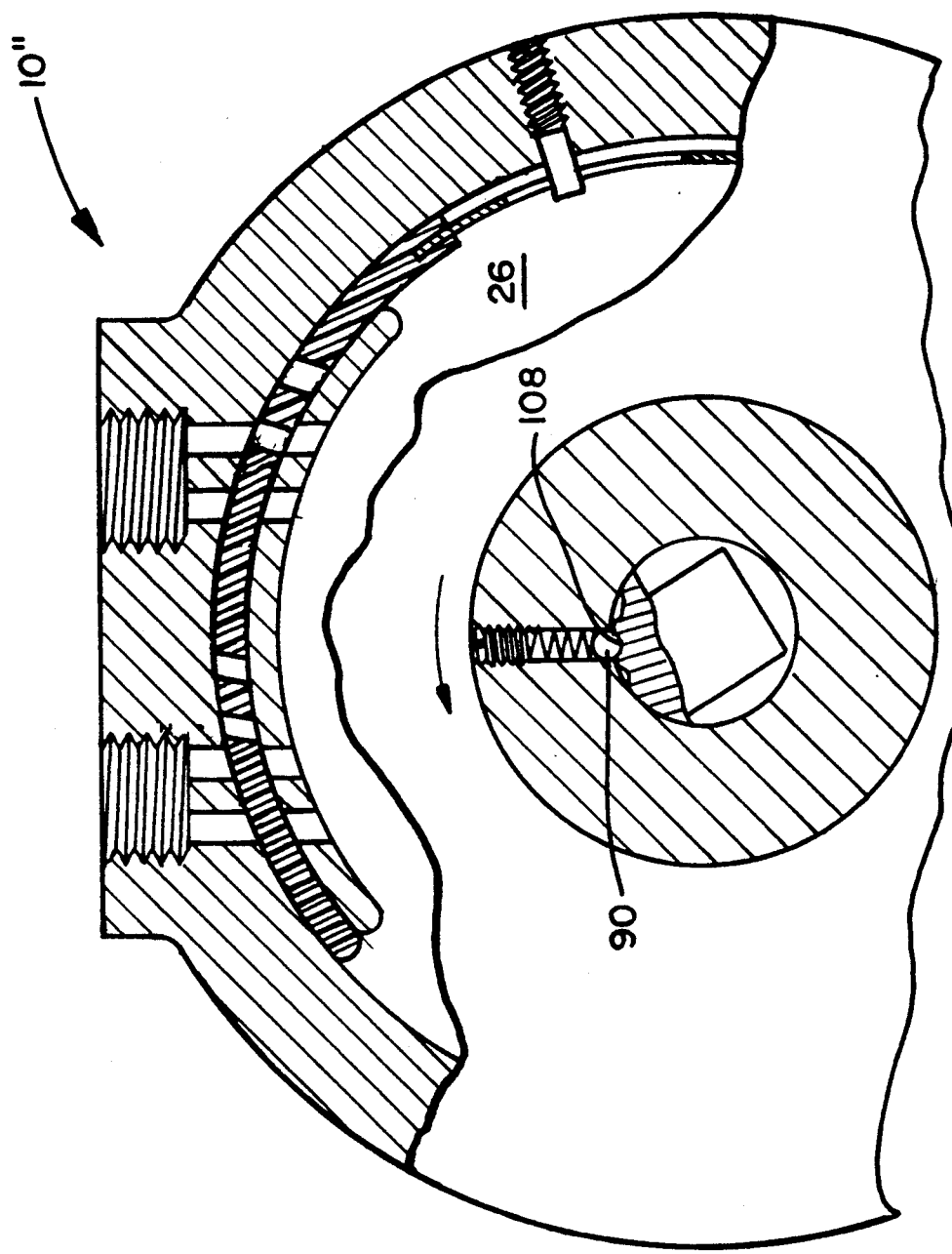
FIG. 8 is a plan view similar to FIG. 7, showing the control gates in a condition for admittance of cold water before admitting hot water, as the user rotates the control knob toward the left from the closed condition of FIG. 7.

FIGS. 7 and 8 correspond to the conditions shown in FIGS. 3, 5, and 6, respectively, but for a different embodiment 10" in which the control knob operates in the counterclockwise direction from the start mode to the set mode. These figures also show that more than one detent can be provided on the cam race. The first 92 is similar to the detent of FIG. 3, whereas the second 108 corresponds to the initial admittance of cold water. The operating slope 106 follows immediately thereafter. Those ordinarily skilled in this field can easily arrive at variations of the relationship of the cam, ribbon slot, pin, and gate slot configurations to meet individual preferences.

I claim:

1. A constant temperature flow mixing valve for a shower or the like, comprising:

a substantially cylindrical body having a cylindrical wall, a base closing the cylinder at one end, a cover closing the cylinder at the other end, and an axis passing centrally of the wall between the base and the cover;

adjacent and distinct hot and cold fluid inlet ports passing through respective first and second wall portions, said ports each having a plurality of slotted inlet orifices at the inner surface of the wall;

an outlet port in a third wall portion, situated substantially in diametral opposition to the inlet ports;

a rigid, coiled metal ribbon member supported at one end near the axis and having a free end adjacent the body wall, the ribbon member having a length which varies commensurately with the average temperature in the body;

a gate member affixed to the free end or the ribbon member and supported against the first and second wall portions for circumferential movement in response to expansion and contraction of the ribbon member, the gate member including a plurality of slotted orifices arranged as a hot set generally in opposition with the hot inlet orifices and a cold set generally in opposition with the cold inlet orifices, the inlet and gate orifices thereby interacting to admit a variable proportion of hot and cold fluid into the body where the fluid mixes and influences the length of the ribbon member commensurately with the average temperature of the mixed fluid, before exiting the body through the outlet port;

the hot set orifices and cold set orifices being spaced relative to each other and to the inlet orifices such that when the ribbon member expands (contracts) the hot set decreases (increases) hot inlet flow, while the cold set of orifices increases (decreases) cold inlet flow;

a setpoint adjustment member supported by the base for rotational movement about the axis, said one end of the ribbon member being secured to the adjustment member, whereby the gate orifices can initially be set manually by turning the adjustment member to a rotational position that produces a desired average temperature, and thereafter the gate orifices passively move with the expansion or contraction of the ribbon member to maintain the average temperature corresponding to said initial setting.

2. The valve of claim 1, wherein the ribbon member includes a slot of limited circumferential extent near the free end, and a pin supported by the wall extends into the slot, thereby limiting the circumferential movement of the gate member.

3. The valve of claim 2, wherein at one limit of the pin against the slot, only cold water and no hot water is admitted.

4. The valve of claim 3, wherein at the other limit of the pin against the slot, only hot water and no cold water is admitted.

5. The valve of claim 4, wherein the inlet orifices and the gate member orifices each have substantially the same cross sectional dimensions.

6. The valve of claim 5, wherein the circumferential extent of the slot is equal to the thickness of the pin plus the dimension of each orifice along said wall portions.

7. The valve of claim 2, including means for maintaining the gate member in circumferential contact with the first and second wall positions as the gate member moves.

8. The valve of claim 1, wherein the setpoint adjustment member includes first detent means for defining a repeatable gate member position wherein none of the gate orifices are in registry with the inlet orifices.

9. The valve of claim 8, wherein manual rotation of the adjustment member from the detent first aligns the cold gate orifices with the cold inlet orifices for cold fluid flow into the body, while the hot gate orifices block the hot inlet orifices until further rotation of the adjustment member increases the flow alignment of the hot gate orifices.

* * * * *

UNITED STATES PATENT AND TRADEMARK OFFICE
CERTIFICATE OF CORRECTION

PATENT NO. : 5,273,208
DATED : December 28, 1993
INVENTOR(S) : Frank A. Herrick

It is certified that error appears in the above-indentified patent and that said Letters Patent is hereby corrected as shown below:

Column 6, line 27, change "or" to --of--.

Signed and Sealed this

Thirty-first Day of December, 1996

Attest:

BRUCE LEHMAN

*Attesting Officer*     *Commissioner of Patents and Trademarks*